US012215398B2

(12) United States Patent
Yamazaki et al.

(10) Patent No.: US 12,215,398 B2
(45) Date of Patent: Feb. 4, 2025

(54) COATING LIQUID FOR FORMING INSULATION COATING FOR GRAIN-ORIENTED ELECTRICAL STEEL SHEETS, GRAIN-ORIENTED ELECTRICAL STEEL SHEET, AND METHOD FOR PRODUCING GRAIN-ORIENTED ELECTRICAL STEEL SHEET

(71) Applicant: NIPPON STEEL CORPORATION, Tokyo (JP)

(72) Inventors: Shuichi Yamazaki, Tokyo (JP); Shinsuke Takatani, Tokyo (JP); Hiroyasu Fujii, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 616 days.

(21) Appl. No.: 17/283,208

(22) PCT Filed: Oct. 2, 2019

(86) PCT No.: PCT/JP2019/038992
§ 371 (c)(1),
(2) Date: Apr. 6, 2021

(87) PCT Pub. No.: WO2020/085024
PCT Pub. Date: Apr. 30, 2020

(65) Prior Publication Data

US 2021/0381072 A1 Dec. 9, 2021

(30) Foreign Application Priority Data

Oct. 25, 2018 (JP) ................................ 2018-200878

(51) Int. Cl.
*C23C 22/50* (2006.01)
*C21D 8/12* (2006.01)
(Continued)

(52) U.S. Cl.
CPC ......... *C21D 8/1283* (2013.01); *C21D 8/1288* (2013.01); *C21D 9/46* (2013.01);
(Continued)

(58) Field of Classification Search
CPC ...... C21D 8/1283; C21D 8/1288; C21D 9/46; C21D 2201/05; C23C 22/50; C23C 22/76;
(Continued)

(56) References Cited

U.S. PATENT DOCUMENTS 3,398,010 A 8/1968 Harvey et al.
3,856,568 A 12/1974 Tanaka et al.
(Continued)

FOREIGN PATENT DOCUMENTS

CN 104876530 A 9/2015
EP 0 438 601 A1 7/1991
(Continued)

OTHER PUBLICATIONS

International Preliminary Report on Patentability (Form PCT/IPEA/409) for International Application No. PCT/JP2019/038992, dated Sep. 8, 2020.

*Primary Examiner* — Nicholas A Wang
*Assistant Examiner* — Maxwell Xavier Duffy
(74) *Attorney, Agent, or Firm* — Birch, Stewart, Kolasch & Birch, LLP

(57) ABSTRACT

A coating liquid for forming an insulation coating for grain-oriented electrical steel sheets, which contains boric acid and hydrated silicate particles containing aluminum, and a method for producing a grain-oriented electrical steel sheet comprising applying the coating liquid to a grain-oriented electrical steel sheet after final annealing, and then performing a baking treatment.

11 Claims, 3 Drawing Sheets

(51) Int. Cl.

| | |
|---|---|
| ***C21D 9/46*** | (2006.01) |
| ***C23C 22/76*** | (2006.01) |
| ***C23C 22/78*** | (2006.01) |
| ***H01F 1/147*** | (2006.01) |
| ***H01F 1/153*** | (2006.01) |

(52) U.S. Cl.

CPC .............. *C23C 22/50* (2013.01); *C23C 22/76* (2013.01); *C23C 22/78* (2013.01); *H01F 1/14783* (2013.01); *H01F 1/15383* (2013.01); *C21D 2201/05* (2013.01)

(58) Field of Classification Search

CPC ..... C23C 22/78; C23C 22/05; H01F 1/14783; H01F 1/18

See application file for complete search history.

(56) References Cited

U.S. PATENT DOCUMENTS

| | | | | |
|---|---|---|---|---|
| 2012/0088096 | A1* | 4/2012 | Takeda | C04B 28/344 428/327 |
| 2016/0305026 | A1 | 10/2016 | Terashima et al. | |

FOREIGN PATENT DOCUMENTS

| | | | | | |
|---|---|---|---|---|---|
| JP | 48-39338 | A | | 6/1973 | |
| JP | 52-37934 | A | | 3/1977 | |
| JP | 53-48946 | A | | 5/1978 | |
| JP | 54-143737 | A | | 11/1979 | |
| JP | 3-166384 | A | | 7/1991 | |
| JP | 6-65754 | A | | 3/1994 | |
| JP | 6-85755 | A | | 3/1994 | |
| JP | 06065755 | A | * | 3/1994 | C21D 8/1288 |
| JP | 6-287764 | A | | 10/1994 | |
| JP | 6-306628 | A | | 11/1994 | |
| JP | 7-278832 | A | | 10/1995 | |
| JP | 8-283957 | A | | 10/1996 | |
| JP | 9-256164 | A | | 9/1997 | |
| JP | 9-272983 | A | | 10/1997 | |
| JP | 8-325745 | A | | 12/1998 | |
| JP | 2000-169972 | A | | 6/2000 | |
| JP | 2000-178760 | A | | 6/2000 | |
| JP | 3169500 | B2 | | 5/2001 | |
| JP | 2003-171773 | A | | 6/2003 | |
| JP | 2017-75358 | A | | 4/2017 | |
| WO | WO 2010/146821 | A1 | | 12/2010 | |
| WO | WO 2015/115038 | A1 | | 8/2015 | |

* cited by examiner

COATING LIQUID FOR FORMING INSULATION COATING FOR GRAIN-ORIENTED ELECTRICAL STEEL SHEETS, GRAIN-ORIENTED ELECTRICAL STEEL SHEET, AND METHOD FOR PRODUCING GRAIN-ORIENTED ELECTRICAL STEEL SHEET

TECHNICAL FIELD

The present invention relates to a coating liquid for forming an insulation coating for a grain-oriented electrical steel sheet, a grain-oriented electrical steel sheet, and a method for producing a grain-oriented electrical steel sheet.

BACKGROUND ART

A grain-oriented electrical steel sheet has a crystal structure whose main orientation is the (110) [001] orientation, and is usually a steel sheet containing 2% by mass or more of Si. Its main use is for iron core materials such as in transformers, and in particular, materials with low energy loss during transformation, that is, materials with low iron loss are required.

A typical manufacturing process of a grain-oriented electrical steel sheet is as follows. First, a slab containing 2% by mass to 4% by mass of Si is hot-rolled and the hot-rolled plate is then annealed. Next, cold rolling is performed once or it is performed twice or more with an intermediate annealing in between to obtain the final plate thickness, and decarburization annealing is performed. After that, an annealing separator mainly comprising MgO is applied and final annealing is performed. As a result, a crystal structure having the (110) [001] orientation as the main orientation is developed, and a final annealing film mainly comprising $Mg_2SiO_4$ is formed on the surface of the steel sheet. Finally, the coating liquid for forming an insulation coating is applied, baked and then the resulting product is shipped.

The grain-oriented electrical steel sheet has the property of improving iron loss by applying tension to the steel sheet. Therefore, by forming, at a high temperature, an insulation coating made of a material having a coefficient of thermal expansion smaller than that of the steel sheet, tension is applied to the steel sheet, and its iron loss can be improved.

Conventionally, various coating liquids for forming an insulation coating on an electrical steel sheet have been known (see, for example, Patent Documents 1 to 11).

PRIOR ART DOCUMENT

Patent Document

Patent Document 1: Japanese Unexamined Patent Publication (Kokai) No. 48-039338
Patent Document 2: Japanese Examined Patent Publication (Kokoku) No. 54-143737
Patent Document 3: Japanese Unexamined Patent Publication (Kokai) No. 2000-169972
Patent Document 4: Japanese Unexamined Patent Publication (Kokai) No. 2000-178760
Patent Document 5: International Publication No. WO2015/115036
Patent Document 6: Japanese Unexamined Patent Publication (Kokai) No. 06-065754
Patent Document 7: Japanese Unexamined Patent Publication (Kokai) No. 06-065755

Patent Document 8: Japanese Unexamined Patent Publication (Kokai) No. 08-325745
Patent Document 9: Japanese Unexamined Patent Publication (Kokai) No. 09-256164
Patent Document 10: Japanese Unexamined Patent Publication (Kokai) No. 06-306628
Patent Document 11: Japanese Unexamined Patent Publication (Kokai) No. 2017-075358
Patent Document 12: International Publication No. WO2010/146821

SUMMARY OF THE INVENTION

Problems to be Solved by the Invention

An insulation coating obtained by baking a coating liquid composed of colloidal silica, monophosphate and chromic acid disclosed in Patent Document 1 is excellent in various coating properties such as tension.

However, the coating liquid for forming the above-mentioned insulation coating contains hexavalent chromium, and needs consideration for equipment in order to improve the working environment in the process of forming the insulation coating for the grain-oriented electrical steel sheet. Therefore, there is a long-awaited development of a coating liquid for forming an insulation coating for a grain-oriented electrical steel sheet, which does not contain hexavalent chromium and can obtain an insulation coating having excellent various coating properties such as tension.

For example, Patent Documents 2 to 5 describe a coating liquid for forming an insulation coating for a grain-oriented electrical steel sheet, which mainly comprises colloidal silica and monophosphate and uses other additives instead of chromic acid. However, the coating tension of the insulation coating obtained by the coating liquid for forming an insulation coating that does not contain chromic acid and uses an additive other than chromic acid is lower than the coating tension of the insulation coating obtained by the coating liquid for forming an insulation coating containing chromic acid. In addition, all of the additives used in these techniques are more expensive than chromic acid.

On the other hand, Patent Documents 6 and 7 disclose a coating liquid for forming an insulation coating containing alumina sol and boric acid. Further, the coating liquids for forming an insulation coating disclosed in Patent Documents 8 and 9 are a coating liquid for forming an insulation coating containing alumina or alumina hydrate and boric acid, and a coating liquid for forming an insulation coating containing alumina or alumina hydrate, boric acid and colloidal silica, respectively. The coating tension of the insulation coating formed by baking these coating liquids is larger than that of the insulation coating obtained by baking the above-mentioned coating liquid composed of colloidal silica, monophosphate and chromic acid. Further, Patent Document 10 discloses that a grain-oriented electrical steel sheet comprising a crystalline film of $xAl_2O_3{\cdot}yB_2O_3$ can be obtained by applying an aqueous solution sol containing aluminum oxide and boric acid by a method as disclosed in Patent Documents 6 and 7.

However, since these insulation coatings are composed only of a crystalline film of $xAl_2O_3{\cdot}yB_2O_3$, there is still room for further improvement from the viewpoint of corrosion resistance. In addition, many alumina sols as a raw material are expensive.

Hydrated silicate (layered clay mineral) is an example of a substance whose raw material can be obtained at a relatively low cost and which has a possibility of obtaining a large coating tension after baking.

For example, Patent Document 11 discloses a coating liquid composed of kaolin, which is a kind of hydrated silicate, and lithium silicate. The insulation coating obtained by baking the coating liquid described in this document has a coating tension equal to or higher than that obtained by baking the coating liquid composed of colloidal silica, monophosphate and chromic acid. Further, the obtained grain-oriented electrical steel sheet has excellent iron loss. However, all of the insulation coatings made of these coating liquids lack denseness. As a result, it was found that the use of these coating liquids may result in insufficient corrosion resistance of the insulation coating.

Patent Document 12 discloses a coating liquid composed of a filler such as kaolin, which is a kind of hydrated silicate, and a binder containing a metal phosphate. In the insulation coating obtained by baking this coating liquid at 250 to 450° C., kaolin, which is a kind of hydrated silicate, is dispersed as a filler. The local denseness of the insulation coating varies, depending on the dispersion state of the filler. As a result, it was found that the use of these coating liquids may result in insufficient corrosion resistance of the insulation coating.

Therefore, an object of the present invention is to provide a coating liquid for forming an insulation coating for a grain-oriented electrical steel sheet, which enables the achievement of coating properties including high coating tension and excellent corrosion resistance even without using a chromium compound, a grain-oriented electrical steel sheet and a method for producing a grain-oriented electrical steel sheet.

Means for Solving Problems

The means for solving the above problems include the following aspects.

<1>

A coating liquid for forming an insulation coating for a grain-oriented electrical steel sheet, containing aluminum-containing hydrated silicate particles and boric acid.

<2>

The coating liquid for forming an insulation coating for a grain-oriented electrical steel sheet according to item <1>, wherein the hydrated silicate particles have a specific surface area of 20 $m^2/g$ or more.

<3>

The coating liquid for forming an insulation coating for a grain-oriented electrical steel sheet according to any one of item <1> or <2>, wherein the hydrated silicate particles contain at least one type of particles of kaolin and pyrophyllite.

<4>

The coating liquid for forming an insulation coating for a grain-oriented electrical steel sheet according to any one of items <1> to <3>, wherein the content ratio of the hydrated silicate particles to the boric acid is from 0.2 to 1.5 as a B (boron)/Al (aluminum) molar ratio in the coating liquid.

<5>

A grain-oriented electrical steel sheet, comprising
- a base material of a grain-oriented electrical steel sheet, and
- an insulation coating provided on the base material of the grain-oriented electrical steel sheet, which contains crystals of pseudo-tetragonal aluminum borate composed of constituent elements including Al, B and O.

<6>

A method for producing a grain-oriented electrical steel sheet, comprising steps of
- applying the coating liquid for forming an insulation coating for a grain-oriented electrical steel sheet according to any one of items <1> to <4> to a grain-oriented electrical steel sheet after final annealing, and then,
- performing a baking treatment at a baking treatment temperature of 600° C. to 1000° C.

Effect of the Invention

According to the present invention, a coating liquid for forming an insulation coating for a grain-oriented electrical steel sheet, which enables the achievement of coating properties including high coating tension and excellent corrosion resistance even without using a chromium compound, a grain-oriented electrical steel sheet and a method for producing a grain-oriented electrical steel sheet are provided.

DETAILED DESCRIPTION OF THE INVENTION

Figure 1:
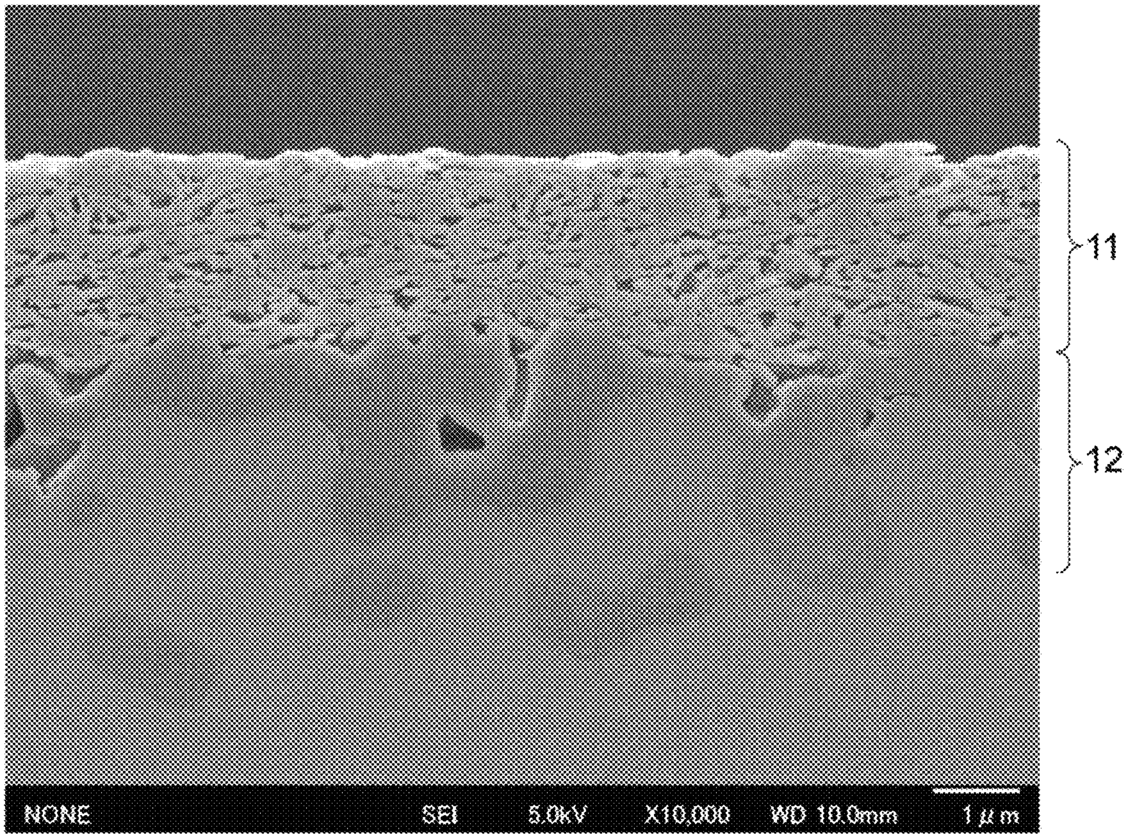
FIG. 1 is a cross-sectional photograph showing an example of a grain-oriented electrical steel sheet provided with a conventional insulation coating.

Hereinafter, an example of a preferred embodiment of the present invention will be described.

Incidentally, in the present specification, the numerical range represented by using "-" means a range including the numerical values before and after "-" as the lower limit value and the upper limit value.

In the present specification, the term "step" includes not only an independent step, but also any step even if it cannot be clearly distinguished from other steps as long as the intended purpose of the step can be achieved.

<Coating Liquid for Forming Insulation Coating for Grain-Oriented Electrical Steel Sheet>

The coating liquid for forming an insulation coating for a grain-oriented electrical steel sheet according to the present embodiment (coating liquid for forming an insulation coating) contains aluminum-containing hydrated silicate particles and boric acid.

As described above, as a coating liquid for forming an insulation coating that does not use a chromium compound, for example, a coating liquid for forming an insulation coating containing alumina sol and boron has been studied. An insulation coating is formed by applying this coating liquid for forming an insulation coating onto a base material of a grain-oriented electrical steel sheet and then baking it. The insulation coating for the grain-oriented electrical steel sheet obtained by the coating liquid for forming an insulation coating containing alumina sol and boron contains aluminum borate crystals and has an excellent coating tension. However, this insulation coating may have inferior corrosion resistance, although the clear cause thereof is not determined. Therefore, there has been room for improving the corrosion resistance while ensuring the properties that excellent coating tension can be obtained in the insulation coating.

Accordingly, we examined the improvement of corrosion resistance of the insulation coating under the conditions that excellent coating tension is ensured. As a result, it was found that by combining hydrated silicate particles with boric acid, an insulation coating for a grain-oriented electrical steel sheet having excellent coating tension and improved corrosion resistance can be obtained. This insulation coating becomes a dense insulation coating. Therefore, it has a coating tension equal to or higher than that of a conventional insulation coating. Further, it is considered that it has better corrosion resistance than the insulation coating obtained by the coating liquid for forming an insulation coating containing alumina sol and boron.

Hereinafter, each material constituting the coating liquid according to the present embodiment will be described.

(Hydrated Silicate Particles)

The coating liquid for forming an insulation coating contains hydrated silicate particles. The hydrated silicate particles may be contained in one type or in two or more types.

Hydrated silicate is also called a clay mineral and often has a layered structure. The layered structure is composed of a 1:1 silicate layer represented by the composition formula $X_{2-3}Si_2O_5(OH)_4$ and 2:1 silicate layer represented by the composition formula $X_{2-3}$ $(Si, Al)_4O_{10}(OH)_2$ (X is Al, Mg, Fe, etc.) as alone or a mixture in the laminated structure. At least one of water molecule and an ion may be contained between layers of the layered structure.

Typical examples of the hydrated silicate include kaolin (or kaolinite) ($Al_2Si_2O_5(OH)_4$), talc ($Mg_3Si_4O_{10}(OH)_2$) and pyrophyllite ($Al_2Si_4O_{10}(OH)_2$). Most of the hydrated silicate particles are obtained by purifying and pulverizing naturally occurring hydrated silicate. As the hydrated silicate particles, at least one kind of particles selected from the group consisting of kaolin, talc and pyrophyllite may be used from the viewpoint of industrial availability. Further, from the viewpoint of obtaining excellent coating tension and excellent corrosion resistance, hydrated silicate particles containing aluminum are used. Hydrated silicate particles containing aluminum have excellent reactivity with boric acid, form pseudo-tetragonal aluminum borate, and provide excellent coating tension and excellent corrosion resistance. From this viewpoint, it is preferable to use at least one kind of particles of kaolin and pyrophyllite as the hydrated silicate particles, and it is more preferable to use kaolin. The hydrated silicate particles may be used in combination.

The larger the specific surface area of the hydrated silicate particles, the easier it is for the reaction with boric acid to be promoted. Therefore, the specific surface area of the hydrated silicate particles is preferably 20 $m^2/g$ or more, more preferably 40 $m^2/g$ or more, and further preferably 50 $m^2/g$ or more.

On the other hand, the upper limit of the specific surface area is not particularly limited, and the specific surface area may be 200 $m^2/g$ or less, 180 $m^2/g$ or less, or 150 $m^2/g$ or less. When the upper limit of the specific surface area is equal to or no more than the above value, it becomes easy to maintain the dispersion stability (viscosity stability) of the coating liquid for forming an insulation coating. The specific surface area of the hydrated silicate particles is the specific surface area based on the BET method, and is measured by a method in accordance with JIS Z 8830: 2013.

(Production of Hydrated Silicate Particles Having a Specific Surface Area of 20 $m^2/g$ or More)

It is difficult to obtain hydrated silicate particles commercially available for industrial use with a specific surface area of 20 $m^2/g$ or more. Therefore, for example, by subjecting a commercially available product to a pulverization treatment, hydrated silicate particles having a specific surface area of 20 $m^2/g$ or more can be obtained.

Ball mills, vibration mills, bead mills, jet mills, etc. are effective as means for pulverizing hydrated silicate particles. These pulverization treatments may be a dry pulverization in which the powder is pulverized as it is, or a wet pulverization in which hydrated silicate particles are dispersed in a dispersion medium such as water or alcohol, and the pulverization is performed in a slurry state. The pulverization treatment is effective in either dry or wet pulverization treatment. The specific surface area of the hydrated silicate particles also increases with the pulverization time by various pulverization means. Therefore, by controlling the pulverization time for the specific surface area of the hydrated silicate particles, the hydrated silicate particles having a required specific surface area and a dispersion liquid thereof can be obtained.

The hydrated silicate may be plate-like particles, because in many cases, the hydrated silicate has a layered structure, that is, a structure in which a plurality of layers are laminated. The pulverization treatment causes peeling of the laminate. That is, the pulverization treatment reduces the thickness of the plate-shaped particles of the plate-shaped hydrated silicate. The thinner this thickness, the easier it is for the reaction with boric acid to be promoted. Therefore, the thickness of the hydrated silicate particles (plate-like particles) is preferably 0.1 μm or less, more preferably 0.05 μm or less, and further preferably 0.02 μm or less.

On the other hand, the lower limit of the thickness of the hydrated silicate particles (plate-like particles) is not particularly limited, but may be 0.001 μm or more because the viscosity of the suspension becomes high when the particle surface is activated and the particles are suspended in water. It may be preferably 0.002 μm or more, and more preferably 0.005 μm or more.

The thickness of the hydrated silicate particles (plate-like particles) is determined by analyzing an image of the hydrated silicate particle shape obtained by a scanning electron microscope or a transmission electron microscope.

In the case of wet pulverization treatment, the viscosity of the dispersion increases as the specific surface area of the hydrated silicate particles increases. When the specific surface area is increased to exceed 200 $m^2/g$ by pulverization, the viscosity of the dispersion may increase to gelate the dispersion, which may interfere with the pulverization treatment. Therefore, a dispersant may be added to the dispersion as needed.

The increase in viscosity during the pulverization treatment can be suppressed by adding a dispersant. However, among the dispersants, if an organic dispersant is added, it may be decomposed and carbonized during baking of the insulation coating and carburized into the grain-oriented electrical steel sheet. Therefore, when a dispersant is used, an inorganic dispersant is preferable. Examples of the inorganic dispersant include polyphosphate, water glass and the like. Specific dispersants of the former include sodium diphosphate and sodium hexametaphosphate. Specific dispersants of the latter include sodium silicate and potassium silicate.

The amount of these inorganic dispersants added is preferably suppressed to 20% by mass or less with respect to the total mass of the hydrated silicate particles. By setting the addition amount of the inorganic dispersant to 20% by mass or less, the change in the film composition after baking is suppressed, and a higher coating tension can be easily obtained. Since the dispersant is an optional additional component, the lower limit of the dispersant is not particularly limited and may be 0%. That is, the coating liquid may not contain a dispersant such as polyphosphate and water glass.

In the case of dry pulverization treatment, it is not necessary to add a dispersant at the time of pulverization.

(Boric Acid)

As boric acid, those obtained by a known production method can be used, and either orthoboric acid or metaboric acid may be used. As boric acid, orthoboric acid is preferably used. Boric acid may be used as a particulate boric acid, or boric acid may be dissolved or dispersed in water before use.

(Content Ratio of Hydrated Silicate Particles and Boric Acid)

The content ratio of the hydrated silicate particles and boric acid contained in the coating liquid for forming an insulation coating is not particularly limited as the B(boron)/Al(aluminum) molar ratio. The B(boron)/Al(aluminum) molar ratio is preferably 1.5 or less from the viewpoint of obtaining excellent coating tension and excellent corrosion resistance. Boric acid and a borate have relatively low solubility in water. Therefore, if the B/Al molar ratio is made too large, the concentration of the coating liquid must be reduced, and it becomes difficult to obtain the desired coating amount. Therefore, the upper limit of the B/Al molar ratio is preferably 1.5 or less, more preferably 1.3 or less, and further preferably 1.0 or less. The lower limit of the B/Al molar ratio is not particularly limited, and may be 0.05 or more, or 0.1 or more. From the viewpoint of obtaining excellent coating tension and excellent corrosion resistance, the lower limit of the B/Al molar ratio is preferably 0.2 or more. Therefore, the content ratio of the hydrated silicate particles and boric acid is preferably 0.2 to 1.5 as described in B(boron)/Al(aluminum) molar ratio.

(Dispersion Medium (or Solvent))

As the dispersion medium or solvent used in the coating liquid for forming an insulation coating, alcohols such as ethyl alcohol, methyl alcohol and propyl alcohol can be used as well as water. As the dispersion medium or solvent, it is preferable to use water from the viewpoint of not having flammability.

The solid content concentration of the coating liquid for forming an insulation coating is not particularly limited as long as it can be applied to a grain-oriented electrical steel sheet. The solid content concentration of the coating liquid for forming an insulation coating is, for example, in the range of 5% by mass to 50% by mass (preferably 10% by mass to 30% by mass).

Further, the coating liquid for forming an insulation coating according to the present embodiment may contain a small amount of other additives, if necessary, or may not contain any other additives (at 0% by mass), as long as the properties of coating tension and corrosion resistance are not impaired. When a small amount of other additives is contained, for example, it is preferably 3% by mass or less, or 1% by mass or less with respect to the total solid content of the coating liquid for forming an insulation coating according to the present embodiment. Examples of other additives include, for example, a surfactant that prevents the coating liquid from repelling on the steel sheet.

The viscosity of the coating liquid for forming an insulation coating is preferably 1 mPa·s to 100 mPa·s from the viewpoint of coating workability and the like. If the viscosity is too high, it may be difficult to apply the coating liquid, and if the viscosity is too low, the coating liquid may flow and it may be difficult to obtain the desired coating amount. The measurement is performed by a B-type viscometer (Brookfield-type viscometer). Further, the measurement temperature is 25° C.

From the viewpoint of working environment, it is preferable that the coating liquid for forming an insulation coating does not contain hexavalent chromium. Further, the insulation coating obtained by the coating liquid for forming an insulation coating according to the present embodiment is baked at a high temperature (for example, 600° C. or higher) in order to obtain a high tension. Therefore, when a resin is contained in the coating liquid for forming an insulation coating, it is decomposed and carburized by baking. As a result, the magnetic properties of the grain-oriented electrical steel sheet are deteriorated. From this viewpoint, it is preferable that the coating liquid for forming an insulation coating does not contain an organic component such as a resin.

Here, the coating liquid for forming an insulation coating according to the present embodiment can impart tension to the steel sheet by baking, and is suitable as a coating liquid for forming an insulation coating for a grain-oriented electrical steel sheet. The coating liquid for forming an insulation coating according to the present embodiment can also be applied to a non-oriented electrical steel sheet. However, even if the coating liquid for forming an insulation coating according to the present embodiment is applied to a non-oriented electrical steel sheet, the insulation coating does not contain an organic component and there is no effect of improving the punching property of the steel sheet. Therefore, the benefit of application to non-oriented electrical steel sheets is small.

(Preparation Method of Coating Liquid)

The coating liquid for forming an insulation coating according to the present embodiment may be prepared by mixing and stirring hydrated silicate particles and boric acid together with a dispersion medium (solvent). The order of addition of the hydrated silicate particles and boric acid is not particularly limited. For example, a dispersion liquid in which a predetermined amount of hydrated silicate particles is dispersed in water as a dispersion medium may be prepared, and then a predetermined amount of boric acid may be added, and the resulting mixture may be mixed and stirred. Alternatively, an aqueous solution of boric acid in which a predetermined amount of boric acid is dissolved in water as a solvent may be prepared, and then a predetermined amount of hydrated silicate particles may be added to the aqueous solution of boric acid, and the resulting mixture may be mixed and stirred.

Also, if necessary, other additives may be added, and the resulting mixture may be mixed and stirred. Then, the coating liquid for forming an insulation coating may be adjusted to a desired solid content concentration. The liquid temperature of the coating liquid may be warmed (for example, 50° C.) or at normal temperature (for example, 25° C.).

(Analysis of Components of Coating Liquid)

In the coating liquid for forming an insulation coating according to the present embodiment, the hydrated silicate particles and boric acid in the coating liquid can be measured as follows.

In the coating liquid in which the hydrated silicate particles and boric acid are mixed, they hardly reacts with each other at 100° C. or lower. Therefore, the coating liquid at 100° C. or lower is in a slurry state in which hydrated silicate particles are dispersed in, for example, an aqueous solution of boric acid.

Specifically, first, the coating liquid for forming an insulation coating is filtered. By filtering, the coating liquid is separated into a filtrate containing a boric acid aqueous solution derived from boric acid before mixing and a residue containing a hydrated silicate derived from hydrated silicate particles. Next, ICP-AES analysis (high frequency inductively coupled plasma-atomic emission spectroscopic analysis) of the filtrate reveals that it contains boric acid. In addition, fluorescent X-ray analysis of the residue reveals the molar ratio of boron to aluminum in the hydrated silicate (B/Al).

Further, the specific surface area of the hydrated silicate particles is measured as follows. The hydrated silicate particles separated as above are dispersed in a solvent in which the hydrated silicate particles are not dissolved. After that, the specific surface area is determined by the above-mentioned BET method. Further, the thickness of the hydrated silicate particles (plate-like particles) is determined by the above-mentioned observation with an electron microscope.

<Method for Producing Grain-Oriented Electrical Steel Sheet and Grain-Oriented Electrical Steel Sheet>

Next, an example of a preferred embodiment of the grain-oriented electrical steel sheet and the method for producing the grain-oriented electrical steel sheet according to the present embodiment will be described.

The grain-oriented electrical steel sheet according to the present embodiment comprising a base material of a grain-oriented electrical steel sheet, and an insulation coating provided on the base material of the grain-oriented electrical steel sheet, wherein the insulation coating contains crystals of pseudo-tetragonal aluminum borate composed of constituent elements including Al, B and O. The insulation coating is composed of a reaction product of boric acid and a hydrated silicate having aluminum, and contains crystals of pseudo-tetragonal aluminum borate composed of constituent elements including Al, B and O in at least a part of the insulation coating.

In the grain-oriented electrical steel sheet according to the present embodiment, the insulation coating containing crystals of pseudo-tetragonal aluminum borate composed of constituent elements containing Al, B and O is different from the conventional insulation coating.

For example, the insulation coating formed of phosphate, colloidal silica and chromic acid based on Patent Documents 1 to 4 is an amorphous substance containing Al, Mg, P, Si, Cr and O as constituent elements. Further, the insulation coating using alumina sol and boric acid represented by Patent Document 6 is composed only of crystalline substance represented by the composition formula $xAl_2O_3 \cdot yB_2O_3$ containing Al, B and O as constituent elements, as shown in Patent Document 10.

On the other hand, the insulation coating according to the present embodiment is composed of the pseudo-tetragonal aluminum borate $xAl_2O_3 \cdot yB_2O_3$ formed by the reaction of the Al component in the hydrated silicate particles with boric acid and the amorphous components derived from the residue other than Al of the hydrated silicate particles. For example, when kaolin is used as the hydrated silicate particles, it becomes a mixture of pseudo-tetragonal aluminum borate and silica as follows. Therefore, the composition of the insulation coating on the grain-oriented electrical steel sheet according to the present embodiment is different from that of the conventional insulation coating.

$$2yH_3BO_3 + xAl_2Si_2O_5(OH)_4 \rightarrow xAl_2O_3 \cdot yB_2O_3 + 2xSiO_2 + (2x+3y)H_2O$$

The grain-oriented electrical steel sheet according to the present embodiment has an excellent coating tension because the insulation coating contains crystals of pseudo-tetragonal aluminum borate composed of constituent elements including Al, B and O. In addition, it has excellent corrosion resistance due to the structure in which the crystalline phase is surrounded by an amorphous layer. Further, a dense film is formed as the insulation coating for the grain-oriented electrical steel sheet according to the present embodiment. The grain-oriented electrical steel sheet according to the present embodiment is preferably obtained by the production method described below.

The method for producing a grain-oriented electrical steel sheet according to the present embodiment comprises steps of applying a coating liquid for forming an insulation coating for a grain-oriented electrical steel sheet according to the present embodiment to the grain-oriented electrical steel sheet after final annealing (that is, a base material of the grain-oriented electrical steel sheet), and then performing a baking treatment in which the temperature of the baking treatment is from 600° C. to 1000° C.

(Grain-Oriented Electrical Steel Sheet after Final Annealing)

The grain-oriented electrical steel sheet after final annealing is a grain-oriented electrical steel sheet that serves as a base material before applying the above coating liquid (that is, the coating liquid for forming an insulation coating according to the present embodiment). The grain-oriented electrical steel sheet after final annealing is not particularly limited. A grain-oriented electrical steel sheet serving as a base material is obtained as a suitable example as follows. Specifically, for example, a steel piece containing 2% by mass to 4% by mass of Si is subject to hot-rolling, hot-rolled plate annealing, cold-rolling, and then decarburization annealing. After that, it is obtained by applying an annealing separator having an MgO content of 50% by mass or more and performing final annealing. The grain-oriented electrical steel sheet after final annealing does not have to have a final annealing film (Applying and Baking Treatment of Coating Liquid for Forming Insulation Coating)

After applying the coating liquid for forming an insulation coating according to the present embodiment to the grain-oriented electrical steel sheet after final annealing, baking treatment is performed. The coating amount is not particularly limited. From the viewpoint of obtaining excellent coating tension and excellent corrosion resistance, it is preferable to apply the coating liquid so that the amount of the film after forming the insulation coating is in the range of 1 $g/m^2$ to 10 $g/m^2$. More preferably, it is 2 $g/m^2$ to 8 $g/m^2$. The coating amount after the baking treatment can be obtained from the weight difference before and after removal of the insulation coating.

Further, the excellent coating tension and corrosion resistance may mean to be equal to or higher than that of a conventional insulation coating, particularly an insulation coating when a coating liquid containing a chromium compound is used. In reference example (insulation coating when a coating liquid containing a chromium compound is used) described later, the coating tension is 8 MPa and the corrosion resistance is 0%. In the insulation coating according to the present embodiment, the coating tension may be 5 MPa or more, preferably 8 MPa or more, and more preferably 10 MPa or more in consideration of the allowable likelihood. Further, the corrosion resistance may be 10% or less, preferably 5% or less, more preferably 1% or less, or 0%.

The method of applying the coating liquid for forming an insulation coating to the grain-oriented electrical steel sheet after final annealing is not particularly limited. For example, a coating method using a coating method such as a roll method, a spray method or a dip method can be mentioned.

After applying the coating liquid for forming an insulation coating, baking is performed. It will promote the reaction between the hydrated silicate particles and boric acid to form a dense film and obtain excellent coating tension and excellent corrosion resistance. Many hydrated silicate release structural water at a heating temperature of around 550° C. and react with boric acid in its process. If the baking temperature is less than 600° C., the reaction between the hydrated silicate particles and boric acid is not sufficient. Therefore, each of the hydrated silicate particles and boric acid may be present in a mixed state in the insulation coating. Therefore, the baking temperature is set to 600° C. or higher. The preferable lower limit of the baking temperature is 700° C. or higher. On the other hand, when the baking temperature of more than 1000° C. is adopted, the grain-oriented electrical steel sheet is softened and easily distorted, and so the baking temperature is set to 1000° C. or less. The preferred upper limit is 950° C. or lower. The baking time is preferably 5 seconds to 300 seconds (preferably 10 seconds to 120 seconds).

The heating method for performing the baking treatment is not particularly limited, and examples thereof include a radiant furnace, a hot air furnace and induction heating.

The insulation coating after the baking treatment becomes a dense film. The thickness of the insulation coating is preferably 0.5 μm to 5 μm (preferably 1 μm to 4 μm).

The thickness of the insulation coating after the baking treatment can be determined by observing the cross section by SEM.

Denseness can be evaluated by the void ratio in the film. When a large amount of voids is present in the film, the insulation coating is considered to have low coating tension and inferior corrosion resistance. In the insulation coating according to the present embodiment, the void ratio may be 10% or less, preferably 5% or less, more preferably 3% or less, more preferably 2% or less, and particularly preferably 1% or less.

Through the above steps, by the coating liquid for forming an insulation coating according to the present embodiment, even if it does not contain a chromium compound, a grain-oriented electrical steel sheet having both excellent coating tension and excellent corrosion resistance can be obtained. Further, the grain-oriented electrical steel sheet provided with the insulation coating by the coating liquid for forming an insulation coating according to the present embodiment has excellent magnetic properties and also has an excellent space factor.

When evaluating coating properties, corrosion resistance, magnetic properties, void ratio of insulation coating, etc. with respect to the grain-oriented electrical steel sheet provided with the insulation coating obtained by the present embodiment, the evaluation method for each evaluation is as follows.

(Corrosion Resistance)

While keeping the temperature at 35° C., a 5 mass % NaCl aqueous solution was continuously sprayed onto the test piece, the state of rust generation after 48 hours had elapsed was observed, and the area ratio was calculated.

(Coating Tension)

The coating tension is calculated from the curvature of the steel sheet that occurs when the insulation coating on one side is removed. The specific conditions are as follows.

Only the insulation coating provided on one side of the grain-oriented electrical steel sheet is removed with an alkaline aqueous solution. After that, the coating tension is calculated from the curvature of the grain-oriented electrical steel sheet by the following formula.

$$\text{Coating tension}=190\times\text{plate thickness (mm)}\times\text{plate curvature (mm)}/\{\text{plate length (mm)}\}^2\ [\text{MPa}] \qquad \text{Formula:}$$

(Space Factor)

It is measured according to the method described in JIS C 2550-5: 2011.

(Coating Void Ratio)

An image of the cross section of the insulation coating is obtained by backscattered electrons. This image is subjected to binarization processing to obtain a binary image. The area $A_C$ of the cross section is obtained by excluding the area of the voids (pores) from this binary image.

The cross-sectional area A including the area of the void (pore) from the binary image filled with the void is obtained. Then, the void ratio F is calculated by the following formula (F).

The insulation coating was observed at a magnification of 5000 to obtain 5 images, and the average value was calculated from the obtained void ratios.

$$F=\{1\cdot(A_C/A)\}\times 100 \qquad \text{Formula (F)}$$

(Iron Loss and Magnetic Flux Density)

The iron loss and the magnetic flux density are measured according to the method described in JIS C 2550-1: 2011. Specifically, the iron loss is measured as an iron loss ($W_{17/50}$) per unit mass under the conditions of an amplitude of the measured magnetic flux density of 1.7 T and a frequency of 50 Hz. Further, the magnetic flux density ($B_8$) is measured as the value of the magnetic flux density at a magnetizing force of 800 A/m.

Although an example of a preferred embodiment of the present invention has been described, the present invention is not limited to the above description. The above description is illustrative, and any embodiment having substantially the same configuration as and exhibiting the similar effect to the technical idea described in the claims of the present invention is within the technical range of the present invention.

EXAMPLES

Hereinafter, the present invention will be specifically described by exemplifying examples, but the present invention is not limited thereto.

Example A

First, commercially available hydrated silicate particles of kaolin, talc and pyrophyllite (specific surface areas of 10 $m^2/g$ for all) were provided and pulverized by various means shown in Table 1 below. In the case where a dispersant was added, for a wet pulverization treatment, it was added upon preparation of a water slurry before the treatment, and for a dry pulverization treatment, it was added upon preparation of a coating liquid after the pulverization treatment. After the pulverization treatment, the specific surface area was measured in accordance with the method described in JIS Z 8830: 2013.

Using the above hydrated silicate particles, a coating liquid having the composition shown in Table 1 was prepared. In order to confirm the stability of the coating liquid, a part of the preparation liquid was collected and left at room temperature (25° C.) for 2 days and nights, and then the state of the coating liquid (presence or absence of gelation) was observed. The coating liquid shown in Example 22 is an example in which two types of hydrated silicate particles are mixed and used. As a result of observation, no gelation was observed in any of the coating liquids having the compositions shown in Table 1.

A grain-oriented electrical steel sheet ($B_8$=1.93T) having a thickness of 0.23 mm and having a finish-annealed film that has been subject to final annealing was prepared, and the coating liquid having the composition shown in Table 1 was applied and dried such that the amount of the insulation coating after baking treatment becomes 5 g/$m^2$, and was baked at 850° C. for 30 seconds.

The coating properties and corrosion resistance of the obtained grain-oriented electrical steel sheet provided with an insulation coating were evaluated. In addition, the magnetic properties were evaluated. Furthermore, the void ratio of the insulation coating was measured. The results are shown in Table 2. The evaluation method of each evaluation shown in Table 2 is as described above.

The molar ratio of B/Al shown in Table 1 is a calculated value obtained by mixing and adjusting the hydrated silicate particles and boric acid so that the molar ratio of B/Al becomes the value shown in Table 1.

TABLE 1

| | Coating Liquid Composition | | | | |
|---|---|---|---|---|---|
| | Hydrated Silicate | | | | |
| | Name | Pulverization Means | Specific Surface Area ($m^2$/g) | Solid Content Concentration (%) | B/Al Molar Ratio |
| Ref. Ex. | Reference Coating Liquid | | | | |
| Comp.Ex. 1 | Comparative Coating Liquid1(Comp. Ex.1) | | | | |
| Comp.Ex. 2 | Kaolin | None | 10 | 25 | 0 |
| Comp.Ex. 3 | Kaolin | JM | 15 | 25 | 0 |
| Comp.Ex. 4 | Talc | BD | 15 | 25 | 0 |
| Comp.Ex. 5 | Talc | BW | 15 | 25 | 0 |
| Example 1 | Kaolin | BW | 20 | 25 | 0.2 |
| Example 2 | Kaolin | BW | 20 | 25 | 0.4 |
| Example 3 | Kaolin | BW | 20 | 25 | 0.6 |
| Example 4 | Kaolin | BW | 20 | 25 | 0.8 |
| Example 5 | Kaolin | BW | 20 | 25 | 1.0 |
| Example 6 | Kaolin | BW | 20 | 12.5 | 0.6 |
| Example 7 | Kaolin | BD | 50 | 25 | 0.2 |
| Example 8 | Kaolin | BD | 50 | 25 | 0.4 |
| Example 9 | Kaolin | BD | 50 | 25 | 0.6 |
| Example 10 | Kaolin | BD | 50 | 25 | 0.8 |
| Example 11 | Kaolin | BD | 50 | 25 | 1.0 |
| Example 12 | Kaolin | JM | 100 | 25 | 0.1 |
| Example 13 | Kaolin | JM | 100 | 25 | 0.2 |
| Example 14 | Kaolin | JM | 100 | 25 | 0.4 |
| Example 15 | Kaolin | JM | 100 | 25 | 0.6 |
| Example 16 | Kaolin | JM | 100 | 25 | 0.8 |
| Example 17 | Kaolin | JM | 100 | 25 | 1.0 |
| Example 18 | Kaolin | BM | 150 | 25 | 0.1 |
| Example 19 | Kaolin | BM | 150 | 25 | 0.2 |
| Example 20 | Kaolin | BM | 150 | 25 | 0.6 |
| Example 21 | Kaolin | BM | 150 | 25 | 0.8 |
| Example 22 | Kaolin | BW | 100 | 12.5 | 0.6 |
| | Talc | BW | 50 | 12.5 | |
| Example 23 | Pyrophyllite | BW | 20 | 25 | 0.6 |
| Example 24 | Pyrophyllite | BW | 50 | 25 | 0.2 |
| Example 25 | Pyrophyllite | BW | 50 | 25 | 0.4 |
| Example 26 | Pyrophyllite | BW | 50 | 25 | 0.6 |
| Example 27 | Pyrophyllite | BW | 50 | 25 | 0.8 |
| Example 28 | Pyrophyllite | BW | 50 | 25 | 1.0 |
| Example 29 | Pyrophyllite | BW | 100 | 25 | 0.6 |
| Example 30 | Pyrophyllite | BW | 150 | 25 | 0.6 |
| Example 31 | Kaolin | BW | 18 | 25 | 0.4 |
| Example 32 | Kaolin | BW | 18 | 25 | 0.6 |
| Example 33 | Kaolin | BW | 18 | 25 | 0.8 |
| Example 34 | Kaolin | BW | 100 | 12.5 | 0.4 |
| | Pyrophyllite | BW | 150 | 12.5 | |
| Example 35 | Kaolin | BD | 50 | 25 | 1.3 |
| Example 36 | Kaolin | BD | 50 | 25 | 1.5 |

TABLE 2

| | Coating properties | | | | Magnetic Properties | |
|---|---|---|---|---|---|---|
| | Corrosion Resistance (%) | Coating tension (MPa) | Space Factor (%) | Coating Void Ratio (%) | Magnetic Flux Density $B_8$ (T) | Iron Loss $W_{17/50}$ (W/kg) |
| Ref. Ex. | 0 | 8 | 96.5 | 0.0 | 1.93 | 0.88 |
| Comp. Ex. 1 | 50 | 15 | 97.0 | 0.0 | 1.93 | 0.78 |
| Comp. Ex. 2 | 30 | 3 | 95.5 | 30.0 | 1.93 | 0.99 |
| Comp. Ex. 3 | 30 | 3 | 95.5 | 20.0 | 1.93 | 0.98 |
| Comp. Ex. 4 | 30 | 3 | 95.5 | 30.0 | 1.93 | 0.99 |
| Comp. Ex. 5 | 30 | 3 | 95.5 | 20.0 | 1.93 | 0.98 |
| Example 1 | 0 | 8 | 96.4 | 5.0 | 1.93 | 0.85 |
| Example 2 | 0 | 10 | 96.6 | 3.0 | 1.93 | 0.82 |
| Example 3 | 0 | 10 | 96.6 | 3.0 | 1.93 | 0.82 |
| Example 4 | 0 | 10 | 96.6 | 3.0 | 1.93 | 0.82 |
| Example 5 | 0 | 10 | 96.6 | 3.0 | 1.93 | 0.82 |
| Example 6 | 0 | 10 | 96.6 | 3.0 | 1.93 | 0.82 |
| Example 7 | 0 | 9 | 96.5 | 3.0 | 1.93 | 0.83 |
| Example 8 | 0 | 11 | 96.7 | 1.0 | 1.93 | 0.80 |
| Example 9 | 0 | 11 | 96.7 | 1.0 | 1.93 | 0.80 |
| Example 10 | 0 | 11 | 96.7 | 1.0 | 1.93 | 0.80 |
| Example 11 | 0 | 11 | 96.7 | 1.0 | 1.93 | 0.80 |
| Example 12 | 0 | 9 | 96.5 | 3.0 | 1.93 | 0.82 |
| Example 13 | 0 | 10 | 96.6 | 2.0 | 1.93 | 0.81 |
| Example 14 | 0 | 11 | 96.7 | 1.0 | 1.93 | 0.80 |
| Example 15 | 0 | 11 | 96.7 | 1.0 | 1.93 | 0.80 |
| Example 16 | 0 | 11 | 96.7 | 1.0 | 1.93 | 0.80 |
| Example 17 | 0 | 11 | 96.7 | 1.0 | 1.93 | 0.80 |
| Example 18 | 0 | 9 | 96.5 | 3.0 | 1.93 | 0.82 |
| Example 19 | 0 | 10 | 96.6 | 2.0 | 1.93 | 0.81 |
| Example 20 | 0 | 11 | 96.7 | 1.0 | 1.93 | 0.80 |
| Example 21 | 0 | 11 | 96.7 | 1.0 | 1.93 | 0.80 |
| Example 22 | 0 | 11 | 96.7 | 1.0 | 1.93 | 0.80 |
| Example 23 | 0 | 10 | 96.6 | 3.0 | 1.93 | 0.82 |
| Example 24 | 0 | 9 | 96.5 | 3.0 | 1.93 | 0.83 |
| Example 25 | 0 | 11 | 96.7 | 1.0 | 1.93 | 0.80 |
| Example 26 | 0 | 11 | 96.7 | 1.0 | 1.93 | 0.80 |
| Example 27 | 0 | 11 | 96.7 | 1.0 | 1.93 | 0.80 |
| Example 28 | 0 | 11 | 96.7 | 1.0 | 1.93 | 0.80 |
| Example 29 | 0 | 11 | 96.7 | 1.0 | 1.93 | 0.80 |
| Example 30 | 0 | 11 | 96.7 | 1.0 | 1.93 | 0.80 |
| Example 31 | 0 | 8 | 96.4 | 5.0 | 1.93 | 0.85 |
| Example 32 | 0 | 9 | 96.5 | 3.0 | 1.93 | 0.83 |
| Example 33 | 0 | 9 | 96.5 | 3.0 | 1.93 | 0.83 |
| Example 34 | 0 | 11 | 96.7 | 1.0 | 1.93 | 0.80 |
| Example 35 | 0 | 12 | 96.7 | 1 | 1.93 | 0.79 |
| Example 36 | 0 | 12 | 96.7 | 1 | 1.93 | 0.79 |

The composition of the reference coating liquid in Table 1 is as follows.

Colloidal silica 20% by mass aqueous dispersion: 100 parts by mass

Aluminum phosphate 50% by mass aqueous solution: 60 parts by mass

Chromic anhydride: 6 parts by mass

The composition of the comparative coating liquid 1 in Table 1 is as follows.

Alumina sol with a solid content of 10% by mass: 100 parts by mass

Boric acid: 7 parts by mass

The solid content concentrations (mass %) of hydrated silicate particles (clay mineral particles) and boric acid in Table 1 are calculated as anhydrous equivalents, wherein, for example, kaolin is $Al_2O_3 \cdot 2SiO_2$ and boric acid is $B_2O_3$.

The pulverization means in Table 1 are as follows.

JM: Jet mill (dry type)

BD: Ball mill (dry type)

BW: Ball mill (wet type)

BM: Bead mill (wet type)

As shown in Table 1, Examples 1 to 36 are insulation coatings formed by using a coating liquid for forming an insulation coating containing hydrated silicate particles and boric acid. As shown in Table 2, the insulation coating of each of Examples has a large coating tension and is also excellent in corrosion resistance. Furthermore, it has excellent space factor and magnetic properties.

Further, it can be seen that the insulation coating of each of Examples has the same or higher performance as the film when the coating liquid containing the chromium compound shown in Reference Example is used.

On the other hand, it can be seen that the insulation coating formed by using the coating liquid for forming an insulation coating containing hydrated silicate particles and not containing boric acid is inferior in corrosion resistance. Further, it can be seen that the insulation coating of Comparative Example 1 obtained by the coating liquid containing alumina sol and boric acid is inferior in corrosion resistance.

Figure 2:
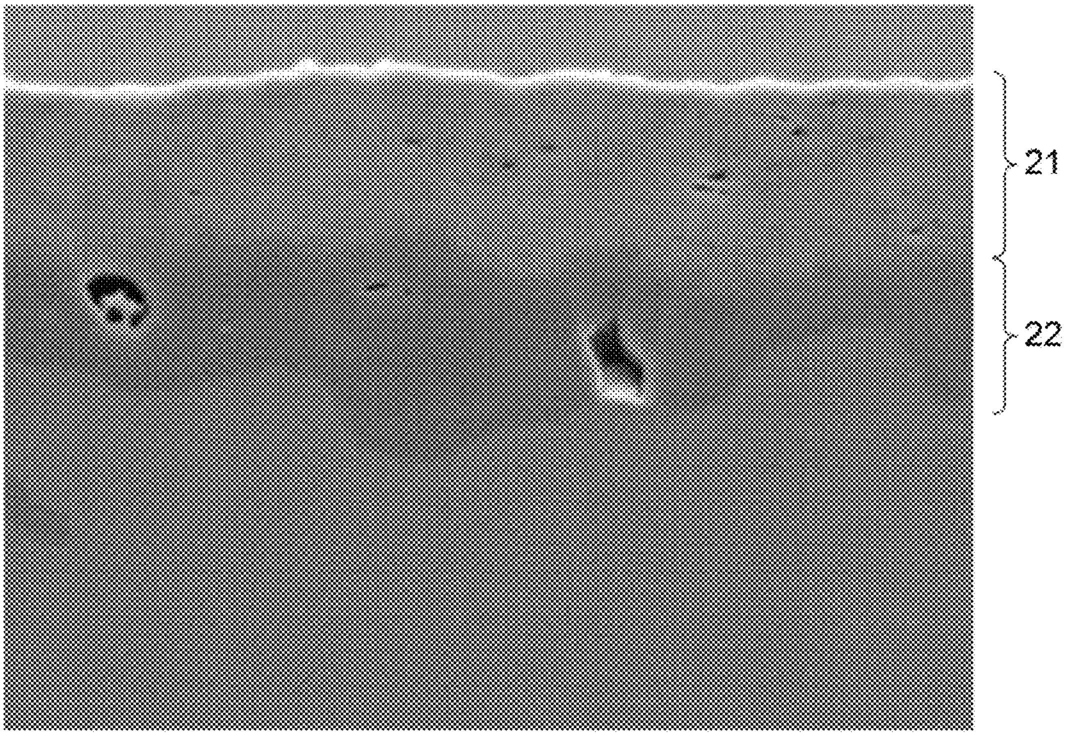
FIG. 2 is a cross-sectional photograph of a grain-oriented electrical steel sheet provided with the insulation coating in Example 10.

Here, FIG. 1 shows an example of the result of observing the cross-section of the grain-oriented electrical steel sheet provided with the conventional insulation coating, by SEM. Further, FIG. 2 shows the results of observing the cross-section of the grain-oriented electrical steel sheet provided with the insulation coating of Example 10, by SEM. In FIG. 1, symbol 11 represents an insulation coating and symbol 12 represents a finish annealed film. Further, in FIG. 2, symbol 21 represents an insulation coating and symbol 22 represents a finish annealed film Hereinafter, the reference numerals for explanation will be omitted.

A large amount of voids is present in the insulation coating shown in FIG. 1. Therefore, it is considered that the insulation coating shown in FIG. 1 has a low coating tension and is also inferior in corrosion resistance. On the other hand, it became clear that the insulation coating shown in FIG. 2 is a dense film having an extremely low amount of voids. Therefore, it is considered that the insulation coating shown in FIG. 2 has a high coating tension and is also excellent in corrosion resistance.

Therefore, the grain-oriented electrical steel sheet obtained by using the coating liquid for forming an insulation coating of the present embodiment has a dense insulation coating, having a large coating tension and excellent corrosion resistance even without using a chromium compound. Further, it can be seen that these coating properties are obtained, and that the magnetic properties and space factor are also excellent.

Figure 3:
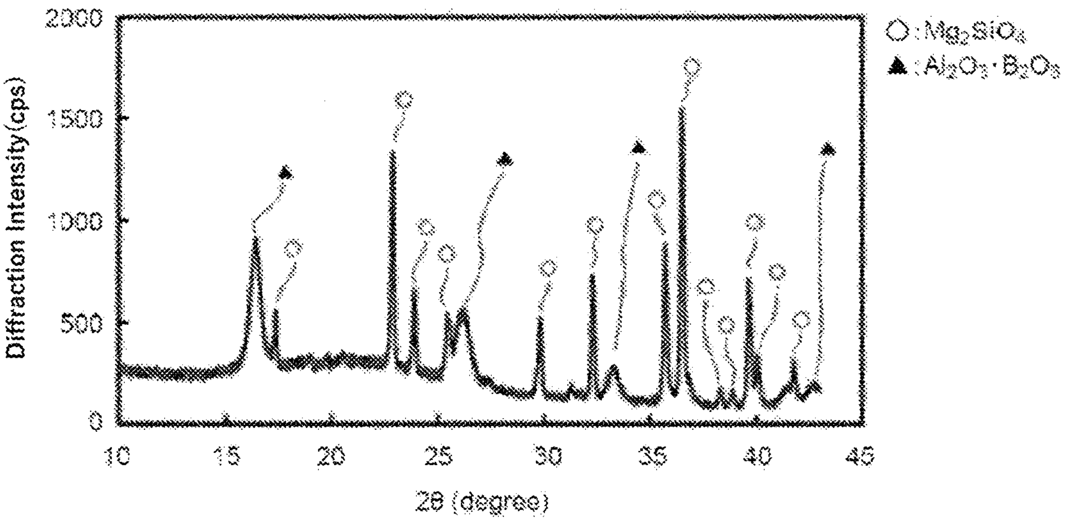
FIG. 3 is a graph showing the result of X-ray crystal structure analysis of the insulation coating in Example 10.

FIG. 3 shows the results of X-ray crystal structure analysis of the insulation coating of Example 10 by an X-ray diffractometer. From the graph shown in FIG. 3, it can be seen that the insulation coating of Example 10 is composed of constituent elements including Al, B and O, and contains pseudo-tetragonal aluminum borate.

Example B

Next, the coating properties and magnetic properties are evaluated by changing the baking temperature. The coating liquid was adjusted to the same composition as in Example 10 is coated and dried by the same procedure as in Example 1 so that the amount of the insulation coating after the baking treatment is 5 g/m$^2$. Then, the baking temperature is changed to the conditions shown in Table 3 and the baking treatment is performed (the baking time is the same). The results are shown in Table 3.

TABLE 3

| | | Coating properties | | | | Magnetic Properties | |
|---|---|---|---|---|---|---|---|
| | Baking Temperature (° C.) | Corrosion Resistance (%) | Coating tension (MPa) | Space Factor (%) | Coating Void Ratio (%) | Magnetic Flux Density $B_8$ (T) | Iron Loss $W_{17/50}$ (W/kg) |
| Comp. Ex. 6 | 500 | 50 | 2 | 95.0 | 40 | 1.93 | 1.10 |
| Comp. Ex. 7 | 550 | 30 | 3 | 95.5 | 30 | 1.93 | 0.99 |
| Example37 | 600 | 1.0 | 8 | 96.4 | 5 | 1.93 | 0.85 |
| Example38 | 700 | 0 | 10 | 96.6 | 2 | 1.93 | 0.82 |
| Example39 | 950 | 0 | 11 | 96.7 | 1 | 1.93 | 0.80 |
| Example40 | 1000 | 0 | 12 | 97.0 | 0 | 1.93 | 0.79 |

As shown in Table 3, Comparative Examples 6 and 7 having a baking temperature of less than 600° C. are inferior in corrosion resistance because the reaction between the hydrated silicate particles and boric acid is not sufficient. On the other hand, in each of Examples in which the baking temperature is 600° C. or higher, excellent corrosion resistance can be obtained.

Although preferred embodiments of the present invention have been described above, the present invention is not limited to such examples. It is clear that a person skilled in the art can come up with various modifications or modifications within the scope of the ideas described in the claims, and it is understood that they naturally belong to the technical scope of the present invention.

The invention claimed is:

1. A coating liquid for forming an insulation coating for a grain-oriented electrical steel sheet by a baking treatment at a baking treatment temperature of 600° C. to 1000° C., containing aluminum-containing hydrated silicate particles and boric acid, and not containing an organic component, wherein polyphosphate is present in the aluminum-containing hydrated silicate particles in a range of 0 to 20 mass % with respect to the aluminum-containing hydrated silicate particles, and wherein the content ratio of the aluminum-containing hydrated silicate particles to the boric acid is from 0.1 to 1.5 as B (boron)/Al (aluminum) molar ratio in the coating liquid.

2. The coating liquid for forming an insulation coating for a grain-oriented electrical steel sheet according to claim 1, wherein the aluminum-containing hydrated silicate particles have a specific surface area of 20 $m^2/g$ or more.

3. The coating liquid for forming an insulation coating for a grain-oriented electrical steel sheet according to claim 1, wherein the aluminum-containing hydrated silicate particles are at least one type of particle of kaolin or pyrophyllite.

4. The coating liquid for forming an insulation coating for a grain-oriented electrical steel sheet according to claim 1, wherein the content ratio of the aluminum-containing hydrated silicate particles to the boric acid is from 0.2 to 1.5 as B (boron)/Al (aluminum) molar ratio in the coating liquid.

5. A method for producing a grain-oriented electrical steel sheet, comprising steps of:

applying the coating liquid for forming an insulation coating for a grain-oriented electrical steel sheet according to claim 1 to a grain-oriented electrical steel sheet after final annealing, and then, performing a baking treatment at a baking treatment temperature of 600° C. to 1000° C.

6. The coating liquid for forming an insulation coating for a grain-oriented electrical steel sheet according to claim 2, wherein the aluminum-containing hydrated silicate particles are at least one type of particle of kaolin or pyrophyllite.

7. The coating liquid for forming an insulation coating for a grain-oriented electrical steel sheet according to claim 2, wherein the content ratio of the aluminum-containing hydrated silicate particles to the boric acid is from 0.2 to 1.5 as B (boron)/Al (aluminum) molar ratio in the coating liquid.

8. The coating liquid for forming an insulation coating for a grain-oriented electrical steel sheet according to claim 3, wherein the content ratio of the aluminum-containing hydrated silicate particles to the boric acid is from 0.2 to 1.5 as B (boron)/Al (aluminum) molar ratio in the coating liquid.

9. A method for producing a grain-oriented electrical steel sheet, comprising steps of:

applying the coating liquid for forming an insulation coating for a grain-oriented electrical steel sheet according to claim 2 to a grain-oriented electrical steel sheet after final annealing, and then, performing a baking treatment at a baking treatment temperature of 600° C. to 1000° C.

10. A method for producing a grain-oriented electrical steel sheet, comprising steps of:

applying the coating liquid for forming an insulation coating for a grain-oriented electrical steel sheet according to claim 3 to a grain-oriented electrical steel sheet after final annealing, and then, performing a baking treatment at a baking treatment temperature of 600° C. to 1000° C.

11. A method for producing a grain-oriented electrical steel sheet, comprising steps of:

applying the coating liquid for forming an insulation coating for a grain-oriented electrical steel sheet according to claim 4 to a grain-oriented electrical steel sheet after final annealing, and then, performing a baking treatment at a baking treatment temperature of 600° C. to 1000° C.

* * * * *